Figure 1:
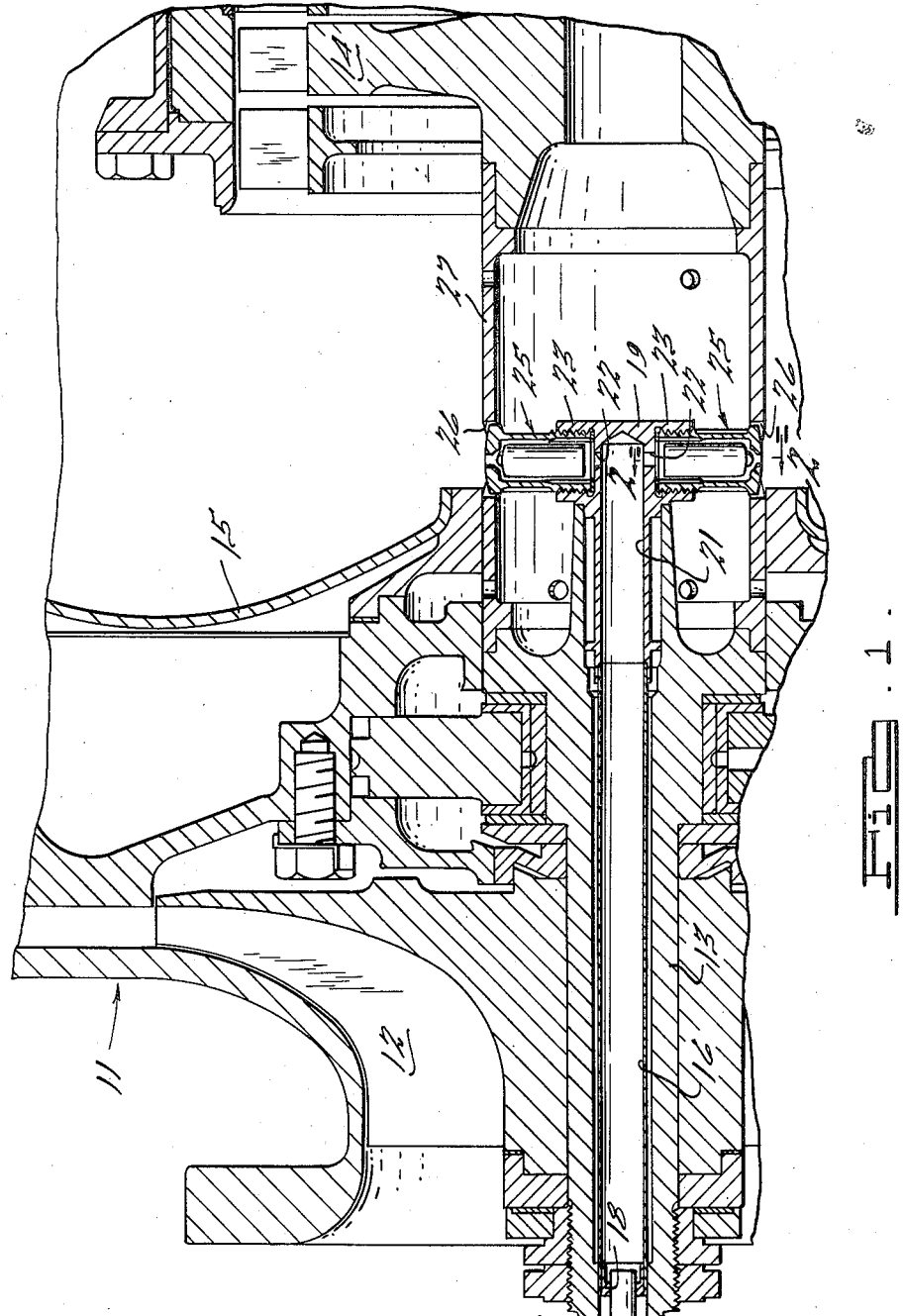

Nov. 25, 1958 S. B. WILLIAMS 2,861,425
FUEL SPRAY DEVICE FOR GAS TURBINE COMBUSTION CHAMBER
Filed July 10, 1956 2 Sheets-Sheet 1

INVENTOR.
Sam B. Williams.
BY
Harness, Dickey & Pierce
ATTORNEYS

Nov. 25, 1958 S. B. WILLIAMS 2,861,425
FUEL SPRAY DEVICE FOR GAS TURBINE COMBUSTION CHAMBER
Filed July 10, 1956 2 Sheets-Sheet 2

INVENTOR.
Sam B. Williams
BY
Barnes, Dickey & Pierce
ATTORNEYS.

United States Patent Office 2,861,425
Patented Nov. 25, 1958

2,861,425

FUEL SPRAY DEVICE FOR GAS TURBINE COMBUSTION CHAMBER

Sam B. Williams, Birmingham, Mich., assignor to Williams Research Corporation, Birmingham, Mich., a corporation of Michigan Application July 10, 1956, Serial No. 596,917

6 Claims. (Cl. 60—39.74)

This invention relates to liquid propelling mechanisms, and more particularly to fuel spray devices especially adapted for use in conjunction with the combustion chambers of gas turbines.

It is an object of the invention to provide an improved liquid propelling device which eliminates the need for a separate high pressure pump in order to force fuel into the combustion chamber of a gas turbine, and in which fuel injection is accomplished by centrifugal action in an efficient and controlled manner.

It is another object to provide a fuel spray device of the above nature which can be used through a wide range of turbine speeds and fuel rates, and which may handle fuels of varying viscosities.

It is also an object to provide an improved fuel spray device having the above characteristics, in which an orifice size may be chosen which gives optimum spray conditions for different fuel rates, and which enables a relatively high pressure to be created at this orifice so that the fuel particles may be finely divided for maximum combustion efficiency.

It is also an object to provide an improved spray device of the above nature, which is of relatively simple and inexpensive construction and requires a minimum amount of maintenance.

Other objects, features and advantages of the present invention will become apparent from the subsequent description, taken in conjunction with the accompanying drawings.

Figure 2:
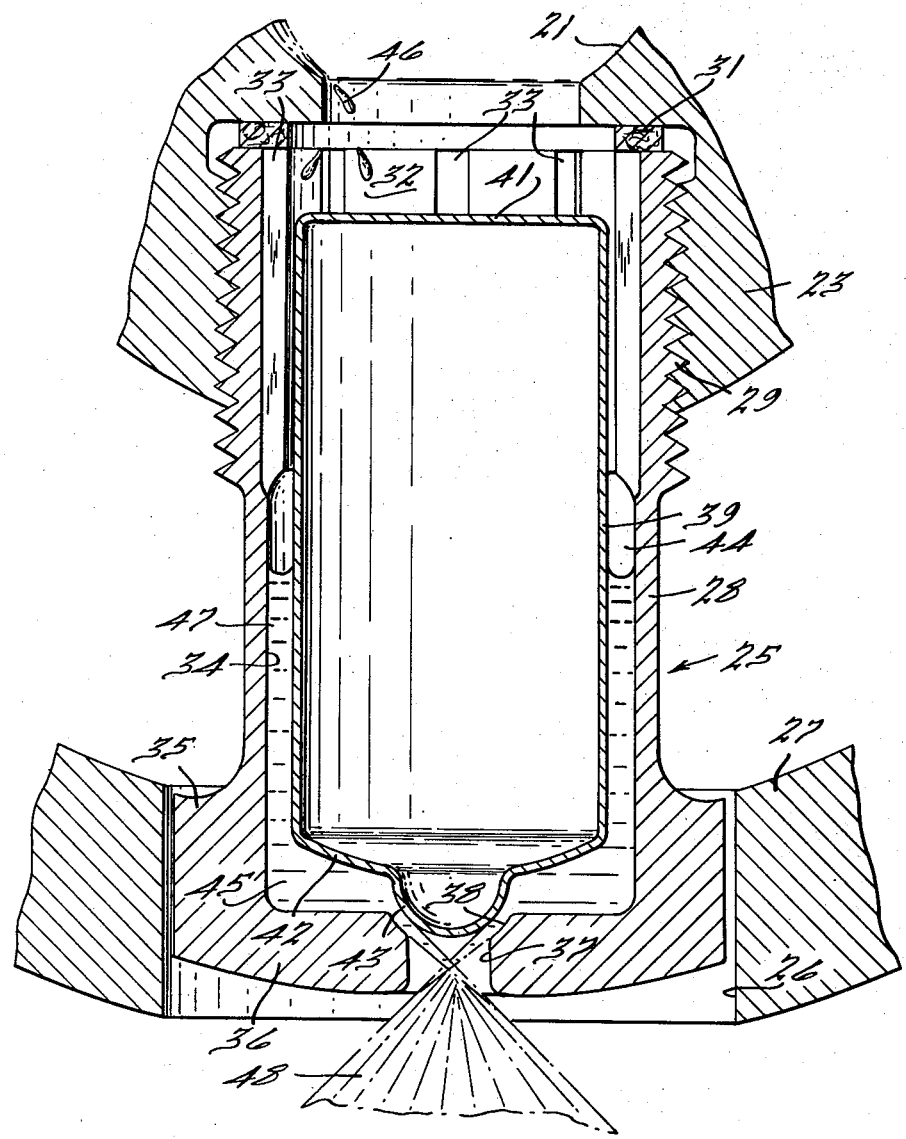

In the drawings:

Figure 1 is a fragmentary elevational view in cross section of a gas turbine showing the disposition of the novel device of this invention with respect to the other turbine components; and Figure 2 is an enlarged cross-sectional view taken along the line 2—2 of Figure 1 and showing the construction of a single nozzle unit and its components.

The invention is shown as incorporated in a gas turbine generally indicated at 11 which is for illustrative purposes of the same general construction as that disclosed in copending application Serial No. 542,328, filed October 24, 1955, by Sam B. Williams and Jack J. Benson. The turbine includes an air compressor 12 mounted on a shaft 13 driven by a rotor 14 of the turbine, the compressor forcing air toward a stationary combustion chamber 15 of annular configuration. Shaft 13 is provided with a central tube 16, and a fuel supply conduit 17 projects within a collar 18 at one end of this tube for fuel feeding purposes. The rate of fuel supplied by conduit 17 may be varied by any conventional means (not shown) such as a variable speed low pressure pump or a gravity feed control. However, the pressure of fuel entering tube 16 from conduit 17 need only be high enough to insure axial flow of this fuel toward the other end of the bore. It will be realized that since this particular gas turbine is shown for illustrative purposes, other means could be utilized for conducting fuel from the supply conduit to the fuel spray device.

The inner end of shaft 13 is provided with a fitting 19 which serves to support the novel fuel spray devices as well as to conduct the fuel running along tube 16 toward the nozzle units. For this purpose, fitting 19 is provided with an axial bore 21 contiguous with tube 16, and a plurality of radial ports 22 leading from bore 21 toward the nozzle units. Fitting 19 is further provided with a plurality of radially extendnig mounting bosses 23 which are internally threaded at 24 for receiving the nozzle units, the latter being generally indicated at 25. Units 25 extend outwardly toward annular combustion chamber 15, the outer ends of the units being disposed within clearance apertures 26 provided in annular portion 27 of shaft 13.

The constructional details of an individual nozzle unit are best seen in Figure 2. The unit comprises a casing 28 of generally cylindrical or tubular shape, the casing having external threads 29 at its inner end for mounting in boss 23 of fitting 19. A ring seal 31 may be provided between the inner end of casing 28 and fitting 19 to prevent fuel leakage through the threaded mount. The inner portion of casing 28 is provided with a bore 32 of predetermined diameter, this bore having a plurality of axially extending grooves 33 spaced around its periphery. The grooves lead to a bore 34 which extends from an intermediate portion of casing 28 toward the outer end thereof, bore 34 being of larger diameter than bore 32. The outer end 35 of casing 28 is enlarged and has an end wall 36 at the center of which is a nozzle orifice 37. The shape of orifice 37 is preferably such as to provide optimum spray characteristics for the fuel when operating in conjunction with the other components of the device as described below. For this purpose, the inner end of orifice 37 may be provided with a flared portion 38.

Within casing 28 is disposed a float 39 which has a length somewhat less than that of bores 32 and 34 combined. Float 39 may be fabricated of an appropriate material such as wood or synthetic material, or as shown in the illustrated embodiment of hollow sheet-metal construction. The inner end wall 41 of float 39 may be of flat construction while the outer end wall 42 is somewhat tapered and has a central nose 43 which, when the float is in its outer position, fits within flared portion 38 of orifice 37 to prevent fuel flow through the orifice.

The diameter of float 39 is such that a fairly close fit is maintained with bore 32 of casing 28, this fit guiding free movement of the float in an axial direction with respect to the casing. With respect to bore 34, the float is of such diameter that a chamber 44 of annular shape is formed between these two parts, this chamber being connected at its inner end with slots 33 and at its outer end with an end chamber 45 formed between walls 36 and 42 of the casing and float respectively. Chamber 45 is connected in turn with orifice 37 when float 39 is away from its outermost position.

In operation, assume an initial condition in which shaft 13 and its associated nozzle units are rotating rapidly, but that no fuel has yet been fed to the units themselves. Under these conditions, the centrifugal force acting on float 39 of each unit will cause nose 43 thereof to close orifice 37. Fuel being fed through bore 21 will run from the wall of this bore through ports 22 and thence, as indicated by droplets 46 in Figure 2, into bore 32 of casing 28. Centrifugal force will cause the fuel to run outwardly through slots 33 and into annular chamber 44, whence it will flow into end chamber 45 of the casing. When sufficient fuel has been fed to the casing to fill up chamber 45, an annular column of fuel, indicated at 47, will begin to build up in chamber 44. The centrifugal forces caused by the weight of this fuel column in the rapidly rotating casing will cause an increase in pressure in end chamber 45, which pressure will act against end wall 42 of float 39, tending to lift the float away from orifice 37. When the height of column 47 has reached a predetermined level, the magnitude of this pressure in end chamber 45 will be sufficient to overcome the centrifugal force on float 39 itself, and the float will thus be lifted slightly away from orifice 37.

When this occurs, fuel will be sprayed out of orifice 37 as indicated at 48 through the annular space which exists between nose 43 of float 39 and tapered portion 38 of the orifice. Because of the nature of the fuel flow through the orifice and the relatively high pressure which exists in chamber 45, a highly atomized spray will be obtained.

This flow will continue until the level of fuel in column 47 has been decreased to such an extent that the pressure in chamber 45 is no longer able to sustain float 39 in its lifted position. The float will then move toward orifice 37, tending to cut off the fuel spray through this orifice. The particular degree to which the spray is decreased before the cycle is repeated will depend upon the rate of fuel supply to the nozzle unit, the rate of rotation of shaft 27, and other factors such as the physical characteristics of the fuel and the relative weights and dimensions of the parts. For example, if fuel is being fed to the nozzle unit at a relatively high rate, partially diminishing the flow rate through orifice 37 will result in fuel column 47 again being built up to a height which will cause repetition of the cycle. On the other hand, it might be possible with relatively low rates of fuel supply to have a condition in which orifice 37 is intermittently closed and opened by the movement of float 39. In actual practice however it has been found that the fluctuations will be sufficiently rapid under all conditions as to cause no interference with the process of combustion in chamber 15.

The relatively high pressure in chamber 45 created by the presence of fuel column 47 will prevent the possibility of the high pressure gases in combustion chamber 15 entering the nozzle unit, a phenomenon which has created problems in the development of conventional types of fuel supply systems for gas turbines. The high pressure created by column 47 will also insure a highly atomized fuel spray under widely varying flow rates, while at the same time permitting the use of an orifice of constant diameter. In known fuel supply systems, a separate and costly high pressure fuel pump is often required, while orifice size must be selected in accordance with type of fuel and rate of flow, in order to maintain a proper fuel level behind the orifice. In the present invention, the orifice may be made with a diameter which will produce optimum spray conditions and may be so shaped as to minimize fouling effects.

It should be noted that while float 39 may be fabricated of any suitable material, it should have a total weight such that it may be lifted by the pressure in chamber 45 when column 47 has reached a suitable height. This height will vary with the density of fuel being utilized, although the mechanism is suitable for use with different types of fuels. Portion 43 of float 39 which cooperates with orifice 37 may have suitable shapes other than that illustrated.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a liquid propelling device, a casing of generally cylindrical shape, a liquid orifice at the outer end of said casing, means for rotating said casing on an axis transverse to its longitudinal axis and adjacent its inner end, means for supplying liquid to said inner end of the casing during such rotation, a float within said casing movable between a first position closing said orifice and a second position away from said orifice, the relative dimensions of said float and casing being such as to form an end chamber at the outer end of said casing and an annular chamber connected with said end chamber, and means for conducting liquid from the inner end of said casing to said annular chamber, whereby the accumulation of liquid to a predetermined level in said annular chamber during rotation of said casing will cause said float to move from its first to its second position.

2. In a liquid propelling device, a casing of generally cylindrical shape, the inner end of said casing being open, a liquid orifice at the outer end of said casing, a bore extending from the inner end of said casing to an intermediate portion thereof, a second bore of larger diameter than said first bore extending from said intermediate portion to the outer end of said casing, a plurality of circumferentially spaced slots extending along said first bore and connected with said second bore, means for rotating said casing on an axis transverse to its longitudinal axis and adjacent said inner end, means for supplying liquid to said inner end of the casing during such rotation, and a float within said casing movable between a first position closing said orifice and a second position away from said orifice, the relative dimensions of said float and said casing bores being such that said float will be guided in its longitudinal movement by said first bore and will form an annular chamber with said second bore, the outer end of said float being so shaped as to form an end chamber within said casing connected with said annular chamber, whereby accumulation of liquid to a predetermined level in said annular chamber during rotation of said casing will cause said float to move from its first to its second position.

3. In a liquid propelling device, a casing of generally cylindrical shape, a liquid orifice at the outer end of said casing, means for rotating said casing on an axis transverse to its longitudinal axis and adjacent its inner end, means for supplying liquid to said inner end of the casing during such rotation, a float within said casing movable between a first position closing said orifice and a second position away from said orifice, a projecting portion at the outer end of said float engageable with said orifice when the float is in its first position, the outer end of said float being tapered so as to form an end chamber at the outer end of said casing, the side wall of said float being of smaller diameter than at least a portion of the inner wall of said casing, whereby an annular chamber is formed connected with said end chamber, and means for conducting liquid from the inner end of said casing to said annular chamber, whereby accumulation of liquid to a predetermined level in said annular chamber during rotation of said casing will cause said float to move from its first to its second position.

4. In a liquid propelling device, a rotatable shaft, a casing extending outwardly from said shaft, a bore within said shaft connected to the inner end of said casing, a liquid orifice at the outer end of said casing, a float within said casing movable between an outer position closing said orifice and an inner position away from said orifice, the relative dimensions of said float and casing being such as to form an end chamber within the outer end of said casing connected with said orifice, an annular chamber connected with said end chamber, and means for conducting liquid from the inner end of said casing to said annular chamber, whereby the accumulation of liquid to a predetermined level in said annular chamber during rotation of said shaft will cause said float to move from its outer to its inner position.

5. In a fuel spray device for use with a gas turbine of the type having an annular combustion chamber, a fuel supply conduit within a rotating shaft of said turbine, and a plurality of nozzle units mounted on said shaft adjacent the turbine combustion chamber, a nozzle unit comprising a casing adapted to be connected to said supply conduit at its inner end, a fuel spray orifice at the outer end of said casing, a float within said casing movable between an outer position closing said orifice and an inner position permitting fuel to be sprayed through said orifice, the relative dimensions of said float and casing being such as to form an end chamber within the outer end of said casing adjacent said orifice and an annular chamber connected to said end chamber, and means for conducting fuel from the inner end of said casing to said annular chamber, whereby the accumulation of fuel in the annular chamber of each of said units to a predetermined level will cause said float to move from its outer to its inner position.

6. The combination according to claim 5, said floats being of cylindrical shape, each of said casings having a first bore adjacent its inner end adapted to guide said float during its movement, and a second bore adjacent its outer end of greater diameter than said first bore.

References Cited in the file of this patent

UNITED STATES PATENTS

| | | |
|---|---|---|
| 2,406,087 | Mallory | Aug. 20, 1946 |
| 2,627,718 | Edenfelt et al. | Feb. 10, 1953 |
| 2,630,815 | Worthing | Mar. 10, 1953 |
| 2,694,291 | Rosengart | Nov. 16, 1954 |
| 2,756,100 | Rittenhouse | July 24, 1956 |